F. DE ROY.
PLANT POSITIONING APPARATUS.
APPLICATION FILED FEB. 16, 1915.
1,183,351. Patented May 16, 1916.
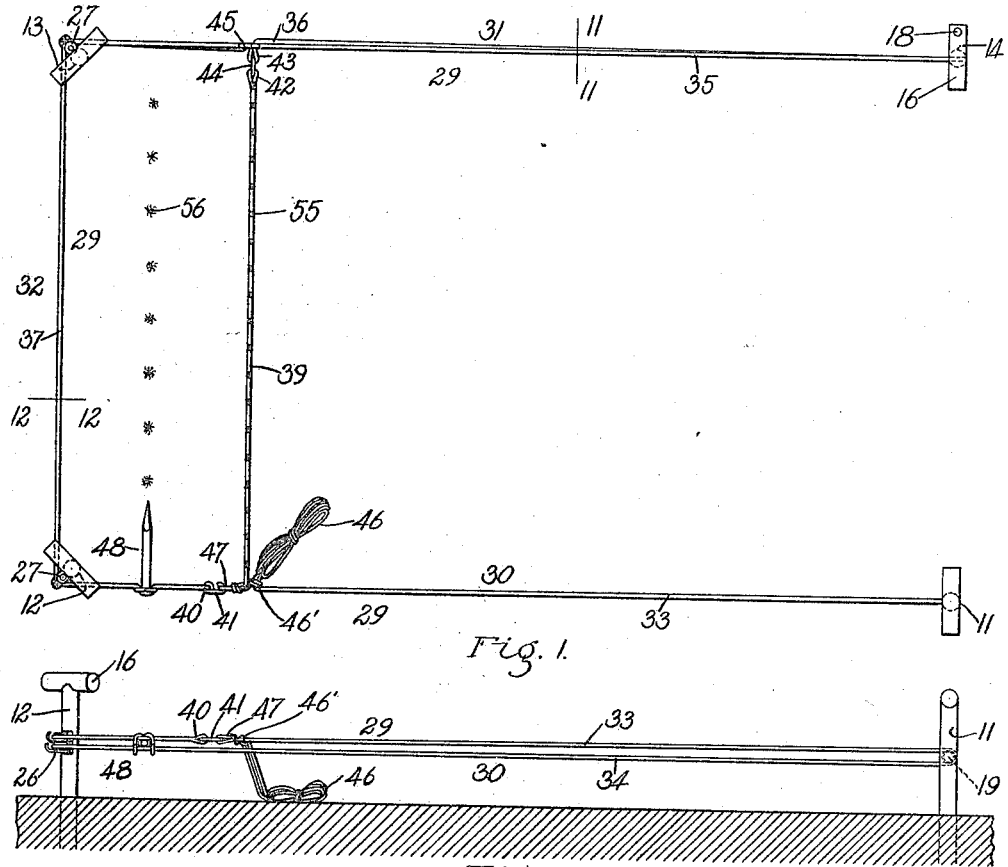
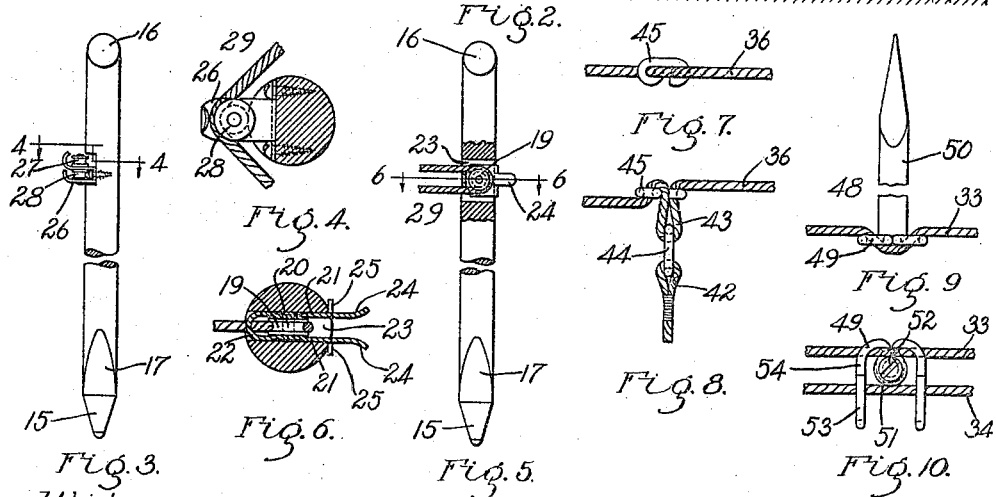

UNITED STATES PATENT OFFICE.

FRANK DE ROY, OF WOONSOCKET, RHODE ISLAND.

PLANT-POSITIONING APPARATUS.

1,183,351.  Specification of Letters Patent.  Patented May 16, 1916.

Application filed February 16, 1915. Serial No. 8,598.

*To all whom it may concern:*

Be it known that I, FRANK DE ROY, a citizen of the United States, residing at Woonsocket, in the county of Providence and State of Rhode Island, have invented new and useful Improvements in Plant-Positioning Apparatus, of which the following is a specification.

This invention relates to an apparatus for positioning plants, shrubs, trees and the like and is intended to be used to position plants in straight rows equidistant apart and also to provide means whereby the plants may be positioned in each row at equal distances apart.

The object of the invention is to provide an apparatus of the character set forth which can be used either on level ground or on uneven or sloping ground and which can be readily adjusted or arranged to suit different requirements as to length of rows, distances apart of rows and the numbers of rows of plants to be set out.

The invention consists in the combination and arrangement of parts set forth in the following specification and particularly pointed out in the claims thereof.

Referring to the drawings: Figure 1 is a plan view of my improved plant positioning apparatus. Fig. 2 is a side elevation of the same showing a section of ground in connection therewith. Fig. 3 is a detail side elevation of one of the standards broken away to save space. Fig. 4 is an enlarged sectional plan taken on line 4—4 of Fig. 3. Fig. 5 is a side elevation of one of the standards shown partly in section and broken away. Fig. 6 is an enlarged sectional plan taken on line 6—6 of Fig. 5. Fig. 7 is a detail side elevation illustrating the manner of forming a loop in one of the side runs of the flexible member. Fig. 8 is a plan view of the side run illustrated in Fig. 7 showing a portion of a cross portion connected thereto. Fig. 9 is a plan view of the indicator broken away to save space. Fig. 10 is an end elevation of the indicator and a portion of the two runs forming one of the side portions of the flexible member. Fig. 11 is a detail section taken on line 11—11 of Fig. 1. Fig. 12 is a detail section taken on line 12—12 of Fig. 1.

Like numerals refer to like parts throughout the several views of the drawings.

In the drawings, 11, 12, 13 and 14 are standards which are pointed at the lower ends as at 15 and have cross-bars 16 at their upper ends whereby the same may be easily forced into a soft soil. These standards are preferably cylindrical and are flatted off at 17 to prevent the standard from turning in the ground and getting out of position. One of the cross-bars 16 is provided with a vertically extending pin 18 whereby the same may be rotated when the apparatus is removed from the ground and it is desired to coil up the flexible member on one of the standards.

The standards 11 and 14 are each provided with a single rotary guide roll 19 (see Figs. 5 and 6). Said guide roll is mounted to rotate upon a pin 20 which extends across between the legs 21 of a U-shaped bracket 22. The bracket 22 is preferably formed of spring metal and is inserted in a slot 23 extending transversely of the standard 11 or 14, as the case may be. When in position in its standard the free ends of the legs 21 extend beyond said standard to form handles 24 whereby the bracket may be conveniently placed in position in the slot 23 or removed therefrom as desired. Laterally extending ears 25 are provided on the legs of said bracket which are arranged to abut against the standard in which said bracket is placed when the same is in position for use.

Each of the standards 12 and 13 has a bracket 26 secured thereto, upon which two guide rolls 27 and 28 are rotatably mounted.

An endless flexible member 29, preferably formed of stout cord, extends around the guide rolls hereinbefore described and comprises in its entirety two side portions 30 and 31 and an end portion 32 which connects said side portions together. Each of the side portions and said end portion consists of two runs constructed and arranged to move longitudinally of said side portions in opposite directions. The side portions 30 consists of the upper run 33 and the lower run 34. The side portion 31 consists of the upper run 35 and the lower run 36. The end portion 32 consists of the upper run 37 and the lower run 38. A cross portion 39 extends from the run 33 of the side portion 30 to the run 36 of said side portion 31, said last-named runs being movable longitudinally of said side portions in the same direction.

The flexible endless member hereinbefore described is preferably constructed as follows: A stout cord has fastened at one end 40 thereof a hook 41 and said cord extends from said hook toward the left (Fig. 1) around the guide roll 27 on the standard 12, thence across the end 32 forming the run 37 and around the corresponding guide roll 27 on the standard 13, thence along the side 31 forming the upper run 35 and around the guide roll 19 on the standard 14, thence returning along the side 31 and forming the lower run 36 and around the lower guide roll 28 on the standard 13, returning across to the side 30 and forming the lower run 38, extending around the lower guide roll 28 on the standard 12, thence extending along the side 30 and forming the lower run 34, thence extending around the guide roll 19 on the standard 11 and returning along the side 30 forming the upper run 33 to the point of beginning where it is knotted to form an eye 47 which is connected to the hook 41. The free end of said cord is then carried across from the side 30 to the side 31 forming the cross portion 39, said free end terminating in an eye 42 which is connected to an eye 43 by a link 44, said eye being formed in the run 36 (see Figs. 7 and 8) by forming a bight around a link 45.

Surplus length of material may be taken care of by winding the same up into a coil 46, preferably adjacent to the cross portion 39 of the cord, so that a portion of the upper run 33 of the side portion 30 may be employed to form a coil 46 (Fig. 1) and then one end of said coil returned to the run 33 and knotted thereon at 46′ then forming an eye 47 which is engaged by the hook 41 and then said cord can be extended across to form the cross member 39 and connected to the run 36 as hereinbefore set forth.

An indicator 48 is adjustably fastened to the run 33 by means of a U-shaped wire 49 (see Figs. 9 and 10). Said indicator comprises, as a whole, a rod 50, preferably formed of wood and the U-shaped guide wire 49, the cross-bar of said U having a downwardly extending eye 51 and fastening means 52 which connects the wire 49 to the rod 50. The free ends 53 of the legs 54 of said U-shaped wire are bent to form hooks which engage the lower strand 34 of the side portion 30 of the apparatus. The upper run 33 extends across said U-shaped wire and engages said eye and the side portions of said U on its opposite sides, whereby said indicator is slidably mounted upon the flexible member for the purpose hereinafter described.

The general operation of the apparatus hereinbefore specifically described is as follows: The standards 11, 12, 13 and 14 are placed at the four corners of the space upon which it is desired to set out plants or shrubs. The cord forming the flexible member 29 is then connected, as illustrated in the drawings and as hereinbefore described, so as to form an endless flexible member with the cross member 39 extending from the side portion 30 to the side portion 31, as hereinbefore described. The cross member 39 is subdivided into parts by index marks 55.

Now, assuming one row of plants 56 to have been positioned and their distance apart indicated by the index marks 55 on the cross member 39, said cross member is then drawn forward a distance equal to the desired distance apart of the rows of plants. The indicator 48 is then placed on the side 30 in alinement with said row of plants 56. Another row of plants is now planted in alinement with the cross portion 39, then said cross portion 39 is drawn forward until the indicator 48 is brought forward to the position formerly occupied by the cross member 39, then another row of plants is laid out in alinement with the cross portion 39 and this operation is repeated for as many times as there are rows of plants to be planted.

If a new plot is to be laid out requiring a greater length of endless member, this greater length can be obtained from the coil 46 by undoing the knot 46′ and paying out sufficient cord to accommmodate the greater length of endless flexible member which is required for a larger plot of land.

Having thus described my invention, what I claim and desire by Letters Patent to secure is:

1. A plant positioning apparatus having, in combination, four standards forming the corners of a quadrilateral, guides on said standards, an endless flexible member extending around said guides and comprising two oppositely disposed side portions and an end portion connecting said side portions together, each of said side portions and said end portion consisting of two runs constructed and arranged to move longitudinally in opposite directions, a cross portion extending from a run of one of said side portions to the run of the other of said side portions which moves in the same direction, and an indicator fast to one of said side runs.

2. A plant positioning apparatus having, in combination, four standards forming the corners of a quadrilateral, guides on said standards, an endless flexible member extending around said guides and comprising two oppositely disposed side portions and an end portion connecting said side portions together, each of said side portions and said end portions consisting of two runs constructed and arranged to move longitudinally in opposite directions, a cross portion extending from a run of one of said side portions to the run of the other of said side portions which moves in the same direction and an indicator secured to one run of one of said side portions and having sliding engagement with the other run of the same side portion.

3. A plant positioning apparatus having, in combination, four standards forming the corners of a quadrilateral, guides on said standards, an endless flexible member extending around said guides and comprising two oppositely disposed side portions and an end portion connecting said side portions together, each of said side portions and said end portion consisting of two runs constructed and arranged to move longitudinally in opposite directions, a cross portion extending from a run of one of said side portions to the run of the other of said side portions which moves in the same direction and an indicator comprising a rod and a U-shaped guide, the cross-bar of said guide having a downwardly extending eye and fastening means extending through said eye into said rod, the free ends of the legs of said guide being turned upwardly from said eye to engage one run of one of said side portions, the other run of the same side portion extending across said guide and engaging the legs thereof, whereby said indicator is slidably mounted upon said flexible member.

4. A plant positioning apparatus having, in combination, four standards forming the corners of a quadrilateral, one of said standards being provided with a vertical slot, guides on said standards, an endless flexible member extending around said guides and comprising two oppositely disposed side portions and an end portion connecting said side portions together, each of said side portions and said end portion consisting of two runs constructed and arranged to move longitudinally in opposite directions and a cross portion extending from a run of one of said side portions to the run of the other of said side portions which moves in the same direction, one of said guides comprising a U-shaped bracket located in said vertical slot in one of said standards and a roll rotatably mounted between the legs of said bracket.

5. A plant positioning apparatus having, in combination, four standards forming the corners of a quadrilateral, one of said standards being provided with a vertical slot, guides on said standards, an endless flexible member extending around said guides and comprising two oppositely disposed side portions and an end portion connecting said side portions together, each of said side portions and said end portion consisting of two runs constructed and arranged to move longitudinally in opposite directions and a cross portion extending from a run of one of said side portions to the run of the other of said side portions which moves in the same direction, one of said guides comprising a U-shaped bracket located in said vertical slot in one of said standards and a roll rotatably mounted between the legs of said bracket, said legs being extended at their free ends beyond said standard and constituting handles whereby said bracket may be positioned in said slot or removed therefrom.

6. A plant positioning apparatus having, in combination, four standards forming the corners of a quadrilateral, one of said standards being provided with a vertical slot, guides on said standards, an endless flexible member extending around said guides and comprising two oppositely disposed side portions and an end portion connecting said side portions together, each of said side portions and said end portion consisting of two runs constructed and arranged to move longitudinally in opposite directions and a cross portion extending from a run of one of said side portions to the run of the other of said side portions which moves in the same direction, one of said guides comprising a U-shaped bracket located in said vertical slot in one of said standards, a roll rotatably mounted between the legs of said bracket and ears projecting laterally from the free ends of said legs and arranged to engage said standard, whereby said bracket may be locked against movement in one direction.

In testimony whereof I have hereunto set my hand in presence of two subscribing witnesses.

FRANK DE ROY.

Witnesses:
LILLIAN M. ISENOR,
ALICE M. MCKENZIE.

Copies of this patent may be obtained for five cents each, by addressing the "Commissioner of Patents, Washington, D. C."